A. H. Brainerd.
Churn Dasher.
No. 78,511. Patented Jan. 2, 1868.
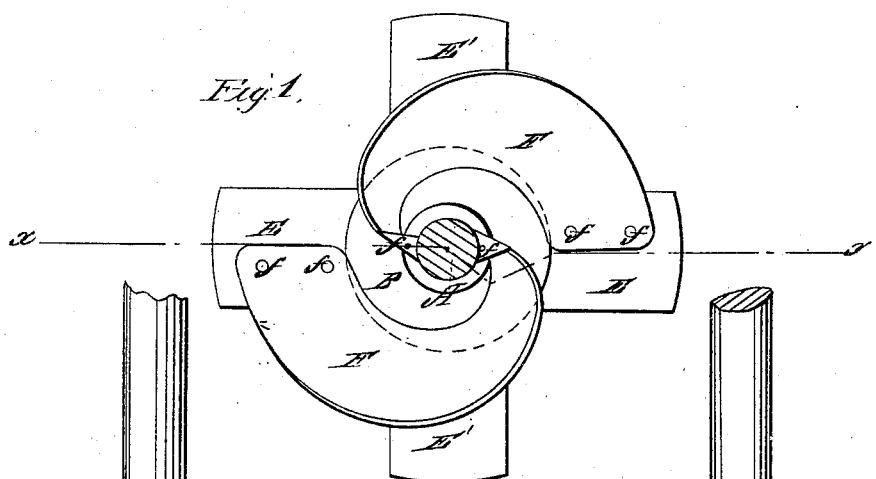
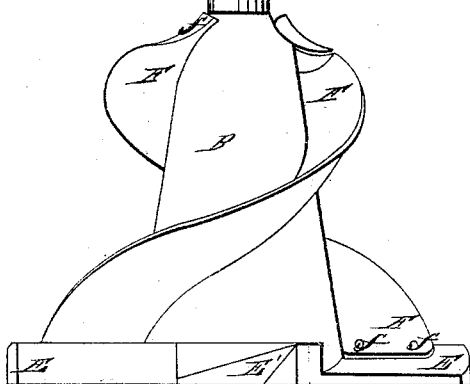
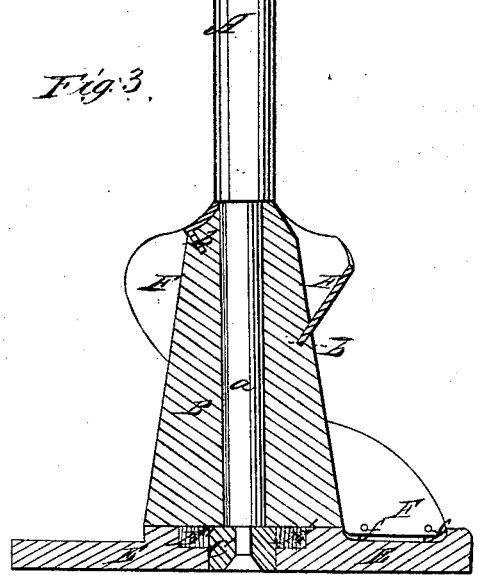
Witnesses:
W. B. Deming
J. S. Ewin
Inventor:
A. H. Brainerd
By Knight & Bro.
attys

United States Patent Office.

ALEXANDER H. BRAINERD, OF ROME, NEW YORK.

*Letters Patent No. 78,511, dated June 2, 1868.*

IMPROVEMENT IN CHURN-DASHER.

*The Schedule referred to in these Letters Patent and making part of the same.*

TO ALL WHOM IT MAY CONCERN:

Be it known that I, ALEXANDER H. BRAINERD, of Rome, in the county of Oneida, and State of New York, have invented a new and useful Improvement in Churn-Dashers; and I do hereby declare the following to be a full, clear, and exact description thereof, reference being had to the accompanying drawing, which is made a part of this specification.

My improvement consists in pivoting the dasher-head to the rod on a vertical spindle, and providing it with a double spiral flange, the action of the cream on which, in the reciprocation of the dasher, will revolve the head in opposite directions.

In the drawings—

Figure 1 is a plan view of my improved dasher.

Figure 2 is an elevation.

Figure 3 is a vertical section on the line $x\,x$, fig. 1.

A may represent the dash-rod, which is constructed with a contracted portion or spindle, $a$, at its lower end; B, a conical head, perforated for the reception of the spindle $a$, and secured on it through the medium of a washer, C, by a screw, D; E E', bevelled bars or floats, rigidly secured, at right angles to each other, to the bottom of the cone B, in any suitable manner; and F F, spiral flanges, secured in spiral grooves $b$ in the periphery of the cone B, and attached to the upper end of said cone, and to the respective ends of the float E, by tacks or screws $f$.

Instead of the mode above described, of pivoting the head to the rod, I propose, in some instances, forming a knob or head on the lower end of said rod, on which the head may rest, and securing it in place by passing a pin through the rod above it. I also propose perforating the float and flanges when desired.

The entire head may be of wood, or other suitable material, and the several parts united in any suitable manner. It may be used in any form of churn; and the reciprocating motion be imparted to it by hand, without machinery, or by any suitable mechanical appliance.

By means of my invention I am enabled, by the vertical reciprocation of the dash-rod, to produce simultaneously an up and down and reciprocating rotary motion of the head, thus greatly expediting the production of the butter, while at the same time the power required to operate the dasher is materially lessened.

Having thus described my invention, what I claim as new therein, and desire to secure by Letters Patent, is—

1. The head B, pivoted upon the reciprocating staff A, and provided with spiral flanges F, substantially as described.

2. In combination with the above, I further claim the bevelled floats E E', substantially as and for the purposes specified.

A. H. BRAINERD.

Witnesses:
DANIEL JOHNSON,
WILLARD M. ELMER.